No. 893,849. PATENTED JULY 21, 1908.
L. LUBIN.
MORTISING AND GROOVING MACHINE.
APPLICATION FILED DEC. 4, 1906.

WITNESSES:
W. M. Avery
J. P. Davis

INVENTOR
Louis Lubin
BY
Munn & Co
ATTORNEYS

UNITED STATES PATENT OFFICE.

LOUIS LUBIN, OF CLICHY, FRANCE.

MORTISING AND GROOVING MACHINE.

No. 893,849.　　　Specification of Letters Patent.　　Patented July 21, 1908.

Application filed December 4, 1906. Serial No. 346,195.

*To all whom it may concern:*

Be it known that I, LOUIS LUBIN, engineer, a citizen of the Republic of France, residing at 21 Rue Martissot, Clichy, Seine, France, have invented certain new and useful Improvements in and Relating to Mortising and Grooving Machines, of which the following is a specification.

The present invention relates to mortising and grooving machines and particularly to the arrangement of the tool holder shaft or of work holder carriage, the section of which is constituted by two parallels united by two semi-circumferences. This arrangement is represented in the accompanying drawing, in which:—

Figure 1:
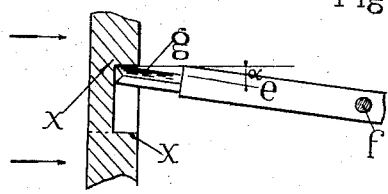
Figure 2:
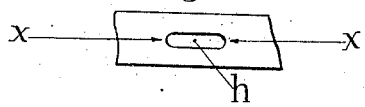
Figure 3:
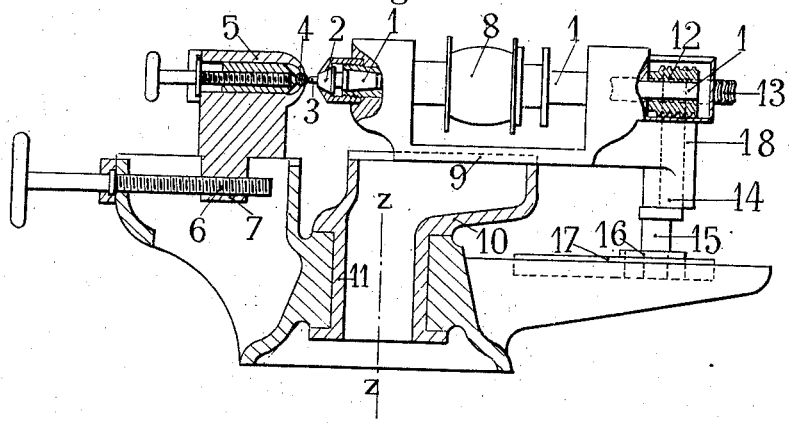

Figure 1 shows the application of the invention. Fig. 2 is a front elevation of the mortise formed. Fig. 3 shows a constructional form of machine which may be of any known kind and to which the invention is applied.

Mortising machines heretofore employed comprise a fixed shaft and a movable shaft which is displaced parallel with its axis. It follows that when it is desired to form a mortise of small size, the tool being too flexible tends to jump or chatter when it reaches each end of its travel. This chattering frequently causes the breakage of the tool, and in particular, owing to the flexion of the tool, conical mortises are formed.

The present invention has for its object means for obviating the defects pointed out above, and consists in the employment of a tool holder shaft $e$ oscillating around a fixed point $f$ (Fig. 1). The result of this movement of oscillation is to present the tool $g$ at each end of its operative stroke at a certain cutting angle $a$ which renders chattering and its harmful effects impossible, the rear portion of the tool being always free. In this manner a mortise $h$ is obtained with absolutely equal dimensions at the beginning and end. This rocking movement is also utilized for replacing the movement of translation of the carriage on which the work is fixed. The same result may be obtained if the shaft is held stationary, and a corresponding movement of oscillation be imparted to the work holding carriage, or any other movement insuring the action of the tool at a certain cutting angle at each end of its travel.

The present invention relates solely to imparting to the tool holder shaft in the case of a fixed carriage, or to the work holder carriage in the case of a fixed shaft, a relative movement of oscillation such that the tool invariably acts at the end of the travel at a sufficient angle for its heel to be out of contact with the work. It is independent of the mechanisms employed for producing this movement, and of the accessory arrangements resulting from the various applications.

The machine represented in Fig. 3 comprises a shaft 1, in which the tool holder 2 carrying the tool 3 is fixed by any appropriate means. The part 4 to be acted upon is held in a movable support or vise 5 which may be displaced on the frame of the machine by an ordinary device comprising a screw 6 and a nut 7.

The shaft 1 carries the driving pulley 8 and the head stock 9 carrying this shaft is mounted upon a support 10 in such a manner that it is able to slide therein. This support 10 terminates in a cylindrical barrel 11 fitted into a recess of the same shape in the frame in such a manner that it is able to rotate about its geometrical axis $z$—$z$. The shaft 1 terminates in an endless screw 12 which meshes with a helicoidal wheel 13 mounted upon a vertical shaft 14 ending at its lower part in an eccentric extension 15 supported in a step bearing 16. This latter is movable in a groove 17 in the frame. The vertical shaft 14 is guided in a sleeve 18 forming one with the head stock 9, in order that the position of the wheel 13 relatively to the screw 12 may remain invariable whatever the position of the headstock 9 may be.

The operation is as follows:—The rotation of the shaft 1 is transmitted by the intermediary of the endless screw 12 and of the wheel 13 to the vertical shaft 14. As the eccentric pivot 15 of this shaft is maintained fixed in the step bearing 16, the shaft 14, while rotating upon itself, is obliged to rotate eccentrically around the axis of the pivot 15. As this shaft 14 is rigidly connected to the headstock 9, and this latter is mounted upon the rotary support 10, it will be understood that this headstock, and consequently the shaft 1, will assume an angular displacement around the axis $z$—$z$ of the barrel 11 which supports this assemblage. The angular displacement of the tool which is shown in Fig. 2 is thus obtained. The amplitude of this angular movement varies with the distance between the axis $z$—$z$ of oscillation of the headstock and the axis of the pivot 15 held in the step bearing 16.

This amplitude may be caused to vary by producing the simultaneous sliding upon the frame of the headstock 9 with its back gear and the step bearing 16. In this manner it is possible to determine the linear displacement of the tool point for any length of mortise to be cut.

It should be understood that the said invention is applicable not only to wood working but to the working of metals or any other materials.

Having now particularly described and ascertained the nature of my said invention and in what manner the same is to be performed, I declare that what I claim is:—

1. In a mortising and grooving machine, a support, a pivoted head stock, a revoluble tool carrying shaft mounted in the head stock, a worm on the shaft, a worm wheel meshing with the worm, and a shaft carrying the worm wheel and having an eccentric at one end mounted in a movable bearing in the support.

2. In a mortising and grooving machine, a support, a pivoted and slidable head stock, a revoluble tool carrying shaft mounted in the head stock, a worm on one end of the shaft, a worm wheel meshing with the worm, and a shaft mounted in the head stock and having at one end an eccentric mounted in a movable bearing in the support.

3. In a mortising and grooving machine, a base frame having a longitudinal groove, a support pivoted upon the base frame, a head stock slidably mounted on the support, a revoluble shaft mounted in the head stock, a worm on one end of the shaft, a shaft mounted in the head stock and having an eccentric extension at one end, a bearing movable in the groove of the base frame and in which the eccentric extension of the said shaft is mounted, and a worm wheel on the other end of the shaft and meshing with the said worm.

In witness whereof I have hereunto set my hand this 22nd day of November 1906.

LOUIS LUBIN.

In the presence of—
 HANSON C. COXE,
 ALBERT NUNES.